(12) United States Patent
Gurcan et al.

(10) Patent No.: US 7,940,273 B2
(45) Date of Patent: *May 10, 2011

(54) DETERMINATION OF UNICODE POINTS FROM GLYPH ELEMENTS

(75) Inventors: Ahmet Gurcan, Mercer Island, WA (US); Eric S. Leese, Seattle, WA (US); Khaled S. Sedky, Sammamish, WA (US); Clifton E. Kerr, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/844,147

(22) Filed: Jul. 27, 2010

(65) Prior Publication Data

US 2010/0290711 A1 Nov. 18, 2010

Related U.S. Application Data

(63) Continuation of application No. 11/553,353, filed on Oct. 26, 2006, now Pat. No. 7,786,994.

(51) Int. Cl.
*G06T 11/00* (2006.01)
(52) U.S. Cl. .................. 345/467; 345/471; 345/947
(58) Field of Classification Search .............. 345/467, 345/471, 947
See application file for complete search history.

(56) References Cited

U.S. PATENT DOCUMENTS

| | | | |
|---|---|---|---|
| 5,526,477 A | 6/1996 | McConnell et al. | |
| 6,426,751 B1 | 7/2002 | Patel et al. | |
| 6,771,267 B1 | 8/2004 | Muller | |
| 7,079,264 B2 | 7/2006 | Nguyen et al. | |
| 7,251,667 B2 | 7/2007 | Atkin | |
| 2002/0120654 A1 | 8/2002 | Xu | |
| 2004/0199876 A1 | 10/2004 | Ethier et al. | |
| 2005/0200913 A1 | 9/2005 | Hohensee et al. | |
| 2005/0248790 A1 | 11/2005 | Ornstein et al. | |
| 2005/0251739 A1 | 11/2005 | Shur et al. | |
| 2005/0270553 A1 | 12/2005 | Kawara | |
| 2005/0273701 A1 | 12/2005 | Emerson et al. | |
| 2006/0149558 A1 | 7/2006 | Kahn et al. | |
| 2006/0170685 A1 | 8/2006 | Wilson Brown | |
| 2006/0171588 A1 | 8/2006 | Chellapilla et al. | |
| 2007/0211062 A1 | 9/2007 | Engelman et al. | |

OTHER PUBLICATIONS

Mehta, et al., "Adapting to OpenType Fonts", retrieved at <<http://www.tug.org/TUGboat/Articles/tb24-3/bella.pdf>>, TUGboat, Proceedings of EuroTEX 2003, vol. 24, No. 3, 2003, pp. 550-556.
"XPS XML Paper Specification", retrieved on Aug. 24, 2006, at <<http://www.microsoft.com/whdc/xps/default.mspx>>, Microsoft Corporation, 2006, pp. 1-2.

(Continued)

*Primary Examiner* — Javid A Amini
(74) *Attorney, Agent, or Firm* — Lee & Hayes, PLLC

(57) ABSTRACT

Systems, methods, and/or techniques ("tools") for determining Unicode points from glyph elements are provided. The tools may receive indications of commands that relate to text containing glyphs. Responding to the commands, the tools may convert the glyphs to corresponding Unicode representations. The tools may also provide glyph substitution tables that include Unicode fields for storing Unicode representations of characters, along with first and second glyph fields for storing glyphs of the characters. The glyph substitution tables may include links pointing from the second glyph fields to the first glyph fields, and may also include links pointing from the first glyph fields to the Unicode fields. The tools may provide character mapping tables that include Unicode fields for storing Unicode representations of characters. The character mapping tables may also include glyph fields for storing glyphs of the characters, and may include links pointing from the glyph fields to the Unicode fields.

20 Claims, 6 Drawing Sheets

OTHER PUBLICATIONS

"XPS/Windows Vista Test Tools", retrieved on Aug. 22, 2006, at <<http://72.14.235.104/search?q=cache: tDSKvoMbmSMJ:www.qualitylogic.com/xps/xps_test_tools/xps_conversion_ats.html+xps+%22printer+driver%22&hl=en&ct=clnk&cd=6>>, QualityLogic, Inc., 2006, pp. 1-3.

1

DETERMINATION OF UNICODE POINTS FROM GLYPH ELEMENTS

PRIORITY CLAIM AND CROSS-REFERENCE TO RELATED APPLICATION

This application is a continuation of and claims priority to U.S. patent application Ser. No. 11/553,353, filed on Oct. 26, 2006, the entire disclosure of which is incorporated herein by reference.

BACKGROUND

Digital documents continue to proliferate, and users continue to demand the ability to display these documents on a variety of different devices. Additionally, these users are demanding the ability to perform a variety of functions on these digital documents.

In many instances, when digital documents are displayed on devices or printed from devices, display or printing applications may call device drivers to display or print the documents. When the display or printing applications call these device drivers, the applications may pass only glyph representations of text to the device drivers, or may pass indices to such glyph representations.

Glyphs or glyph indices relate to visible aspects of characters, for example, the shapes or outlines of the character. However, do not convey meaning associated with the characters. Thus, the glyphs are not interactive, and do not enable the device drivers to perform operations in which the meaning of the characters, as distinguished from the mere appearance of the characters, is relevant.

SUMMARY

Systems, methods, and/or techniques ("tools") that relate to determining Unicode points from glyph elements are described herein. Systems, methods, and/or techniques ("tools") for determining Unicode points from glyph elements are provided. The tools may receive indications of commands that relate to text containing glyphs. Responding to the commands, the tools may convert the glyphs to corresponding Unicode representations. The tools may also provide glyph substitution tables that include Unicode fields for storing Unicode representations of characters, along with first and second glyph fields for storing glyphs of the characters. The glyph substitution tables may include links pointing from the second glyph fields to the first glyph fields, and may also include links pointing from the first glyph fields to the Unicode fields. Finally, the tools may provide character mapping tables that include Unicode fields for storing Unicode representations of characters. The character mapping tables may also include glyph fields for storing glyphs of the characters, and may include links pointing from the glyph fields to the Unicode fields.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to determining Unicode points from glyph elements are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide for determining Unicode points from glyph elements. This discussion also describes other techniques and/or processes that may be performed by the tools.

Figure 1:
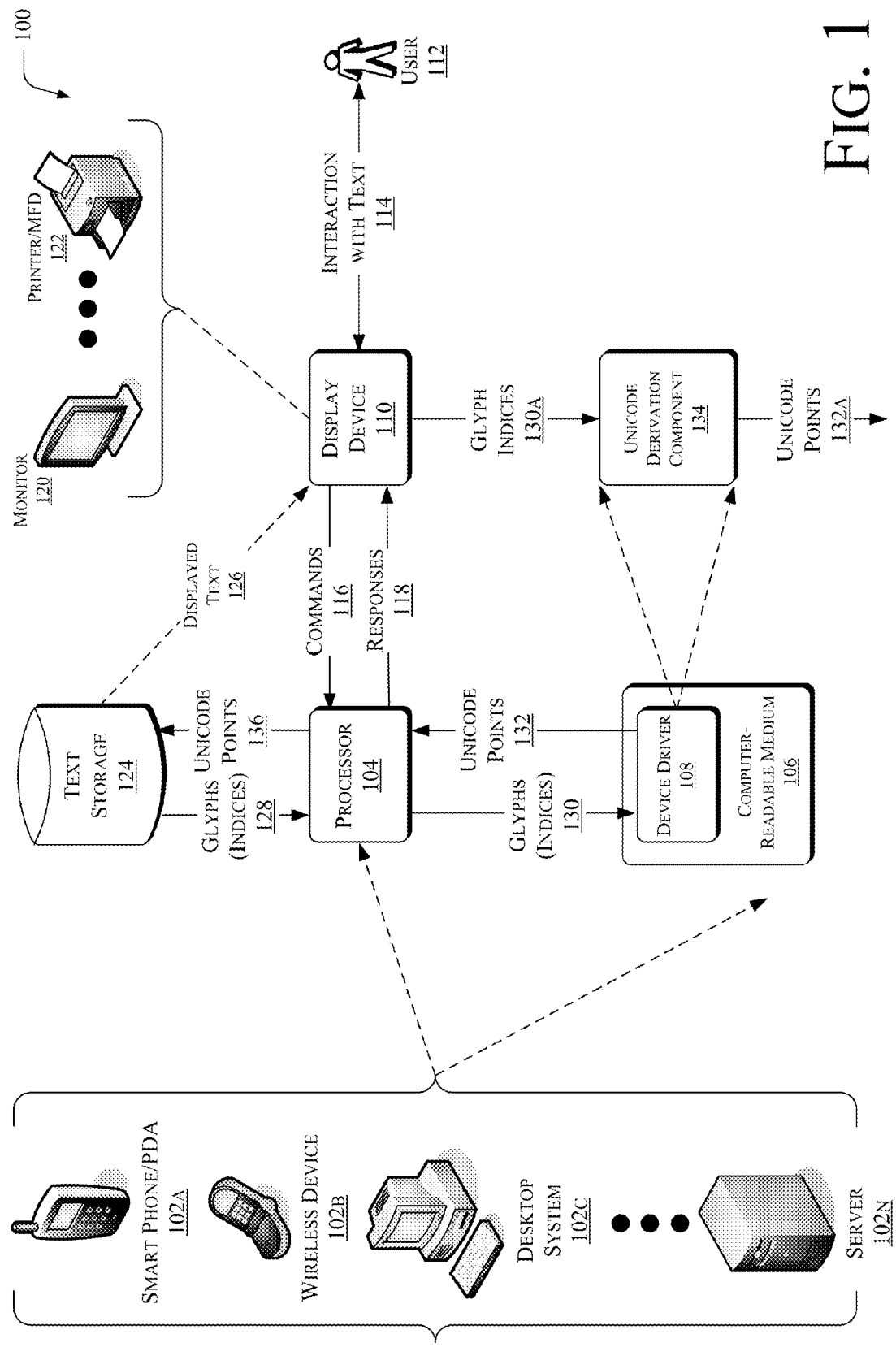
FIG. 1 is a combined block and flow diagram of operating environments suitable for implementing tools for determining Unicode points from glyph elements.

FIG. 1 illustrates an operating environment 100 suitable for implementing tools for determining Unicode points from glyph elements. The operating environment 100 may include one or more devices 102, examples of which may include smart phones and/or personal digital assistants (PDAs) 102a, mobile wireless devices 102b, desktop or laptop computing systems 103c, servers 102n, or the like. It is understood that implementations of the operating environment may include any number of different types of devices 102, although FIG. 1 shows several examples of such devices only for convenience of illustration.

In general, the devices 102 may be computer-based systems that include one or more processor(s) 104 and one or more instances of computer-readable storage media 106. The computer-readable media may contain instructions that, when executed by the processor, perform any of the tools or related functions as described herein. The processor may be configured to access and/or execute the instructions embedded or encoded onto the computer-readable media. The processor may also be categorized or characterized as having a given architecture.

The computer-readable media 106 may include one or more software components 108 that may perform the various functions described herein relating to determining Unicode points from glyph elements. FIG. 1 shows one instance of the software component 108 for convenience only, but these components 108 may be implemented as one or more separate modules.

In possible implementations, this software component 108 may be a device driver associated with, for example, a display device 110 with which a user 112 may interact. For example, the display device 110 may present content to the user 112, with this content including at least some textual subject matter with which the user may interact. FIG. 1 represents this user interaction generally at 114. The user may issue various commends relating to this text, represented generally at 116, which are received and processed by the processor 104. FIG. 1 denotes responses to these commends 116 generally at 118. The display device 110 may include, for example, a display monitor 120, a printer or other multi-function device 122, or the like. The commands 116 and responses 118 are detailed further below in FIG. 2.

The textual content presented to the display device 110 may be stored in a data store 124. The dashed line 126 generally represents this textual content as presented on the display device 110. FIG. 1 shows one data store 124 for convenience only, but the text content may be housed in one or more data stores 124. The data stores may present the text to the display device as one or more glyph elements, which are represented generally at 128. Glyph elements 128 may include bitmaps or other similar graphical descriptions or representations of text characters. This descriptions or representations may express the shapes or outlines of the text 126 as displayed on the devices 110. When the text 126 is printed, for example, the glyphs 128 indicate to the ink nozzles of the printer which areas to fill with ink to print individual characters.

In different operational scenarios, the display device 110 may receive the glyphs 128 themselves. In other scenarios, the display device may receive indices or pointers that reference the glyphs 128.

The commands 116 from the user may reference one or more portions of the displayed text 126. However, these commands may not operate appropriately, given the glyph representations 128. For example, a copy-and-paste command may not function as expected if the command receives a glyph as input. However, these commands may function as expected if they receive, for example, Unicode representations of the text 126. The Unicode Consortium has promulgated the Unicode Standard, which assigns a unique numerical identifier to any letter or character appearing in any natural language on any computing platform.

If the processor 104 receives the command 116 that would not function as expected on the glyphs 128, then the processor may pass the glyphs to the device driver 108, with a request that the device driver 108 convert the glyphs to corresponding Unicode representations or points. The glyphs as input to the device driver are denoted at 130, and the corresponding Unicode points output from the device driver are denoted at 132.

To convert the glyphs 128 to corresponding Unicode points, the device driver 108 may include a Unicode derivation component 134, which may be implemented as one or more software modules or sub-modules. The Unicode derivation component 134 may receive as input one or more glyphs or glyph indices, denoted generally at 130A, and may produce as output one or more Unicode points, denoted generally at 132A.

The glyphs 130 and 130A may be similar or possible identical to one another, but are denoted separately to indicate that the device driver 108 may, in some instances, pre-process the glyphs 130 in some manner before passing them to the Unicode derivation component 134 as glyphs 130A. Likewise, the Unicode points 132 and 132A may be similar or possible identical to one another, but are denoted separately to indicate that the device driver 108 may, in some instances, post-process the Unicode points 132A in some manner before passing them to the processor 104 as Unicode points 132.

Having received the Unicode points 132 that correspond to the portions of the text 126 affected by the commands 116, the processor 104 (or software executing on the processor) may execute the commands 116 on the Unicode points 132, and produce the response 118. The processor 104 may provide this response 118 to the display device 110, for presentation to the user.

In some instances, the processor 104 may store the Unicode points 132 that correspond to the glyphs 128 for later reference. For example, the processor 104 may store the Unicode points in the data store 124, or any other suitable storage structure. In some instances, the Unicode points may be stored in one or more XML files. FIG. 1 generally denotes the Unicode points as stored at 136.

Figure 2:
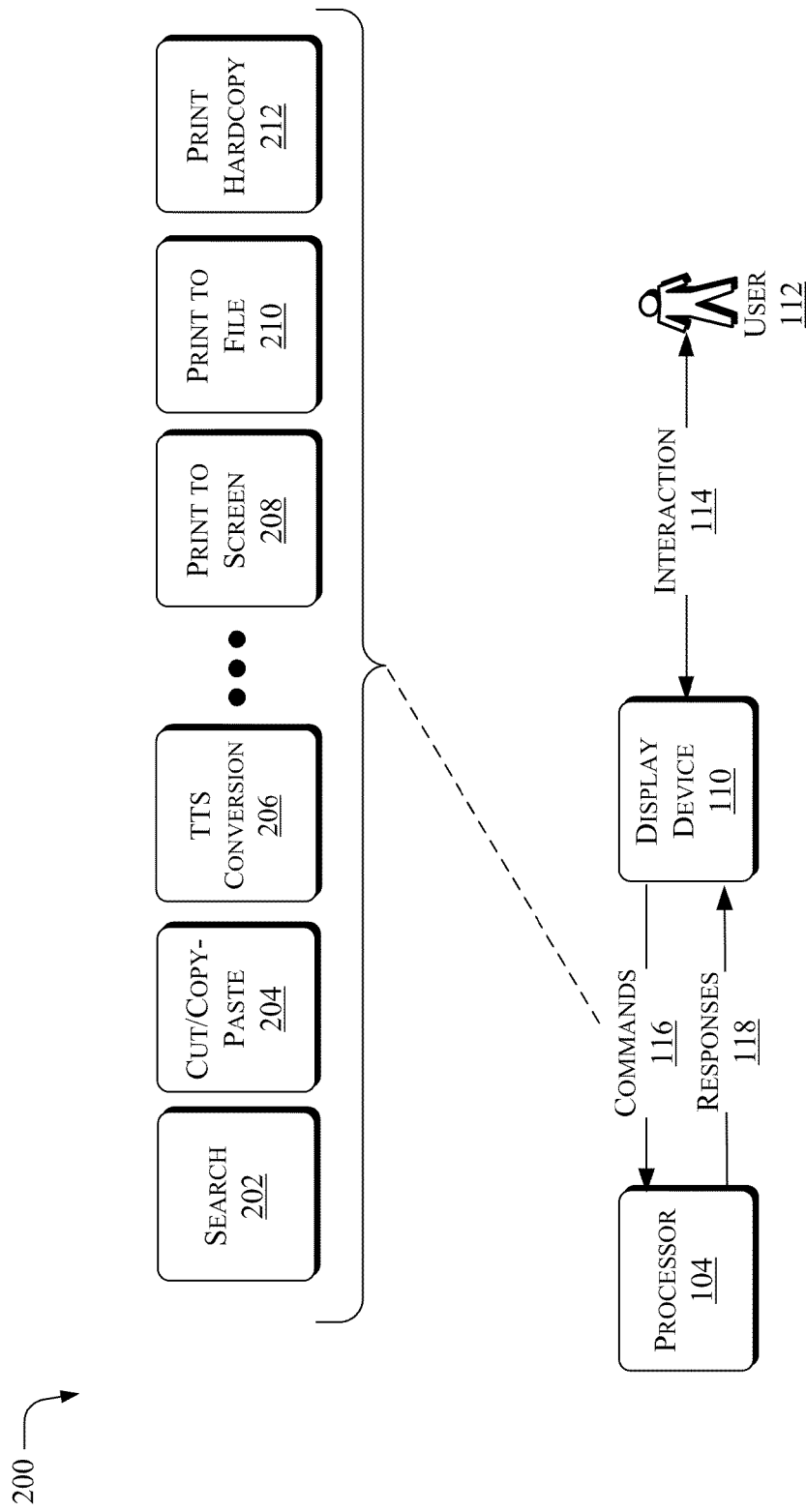
FIG. 2 is a block diagram illustrating examples of various commands to which the tools for determining Unicode points from glyph elements may respond.

Having described the operating environment 100 in FIG. 1, the discussion now turns to a more detailed description of several non-limiting examples of the commands 116, now presented with FIG. 2.

FIG. 2 illustrates examples 200 of various commands 116 to which the tools for determining Unicode points from glyph elements may respond. As described above in FIG. 1, one or more interactions 114 may occur between the user 112 and the display device 110. These interactions 114 may include one or more commands 116 from the user, and corresponding responses 118. These commands, in general, may not provide expected results when executed against the glyphs or glyph indices (e.g., 128), but may operate as expected against Unicode representations of text (e.g., 132). FIG. 1 shows an example of displayed text at 126.

As indicated in FIG. 2, these commands 116 may include a search command, represented generally at 202. The search command 202 may not function correctly, if run against a set of text characters represented only by glyphs or glyph indices. As described previously, the glyphs are images or bitmaps that convey only the shape of the characters, but do not convey what the characters mean. However, the search command 202 may operate as expected if run against the Unicode representations of the text.

Block 204 represents cut commands and/or copy commands issued by the user. These cut and/or copy commands may or may not be combined with paste commands. In any event, these commands may be used to identify representations of one or more text characters, such as the Unicode representations of the characters, appearing in a document, and possibly re-insert the text characters elsewhere in the document. The cut/copy/paste of text as shown in block 204 is distinguished from cutting, copying, and/or pasting images within the document, more specifically, images of text.

Block 206 represents commands issued by the user to convert text, to speech. For example, the user may be visually impaired, or otherwise not able to read text appearing on a display monitor (e.g., 120 in FIG. 1). Thus, the device with which the user is interacting (e.g., 102A-102N in FIG. 1) may include a text-to-speech (TTS) component that processes input text, and synthesizes speech that audibly expresses the text so that the user may hear it. Such TTS components may not be able to process glyphs or glyph indices, but instead may process, for example, Unicode representations of the text.

Blocks 208, 210, and 212 represent various printing operations that may be performed on the displayed text. For example, block 208 represents printing or displaying the text on a screen (e.g., 120 in FIG. 1). Block 210 represents printing the text to a file (e.g., 124 in FIG. 1) for storage, or may represent storing a printable version of the text to the file. Block 212 represents printing a hardcopy of the text on a printer or a multifunction device (e.g., 122 in FIG. 1). In connection with any of the foregoing operations, whether or not related to printing, the displayed text may be formatted or re-formatted during processing. For example, the user may select a portion of text that is displayed on the device, and enter a command to alter an attribute of that text (e.g., bolding or un-bolding). To respond effectively to such commands, the devices may convert glyph representations of the selected text to Unicode points, as detailed further herein. For example, given only a glyph representation of selected text, the device may not be able to bold or un-bold the selected text.

Figure 3:
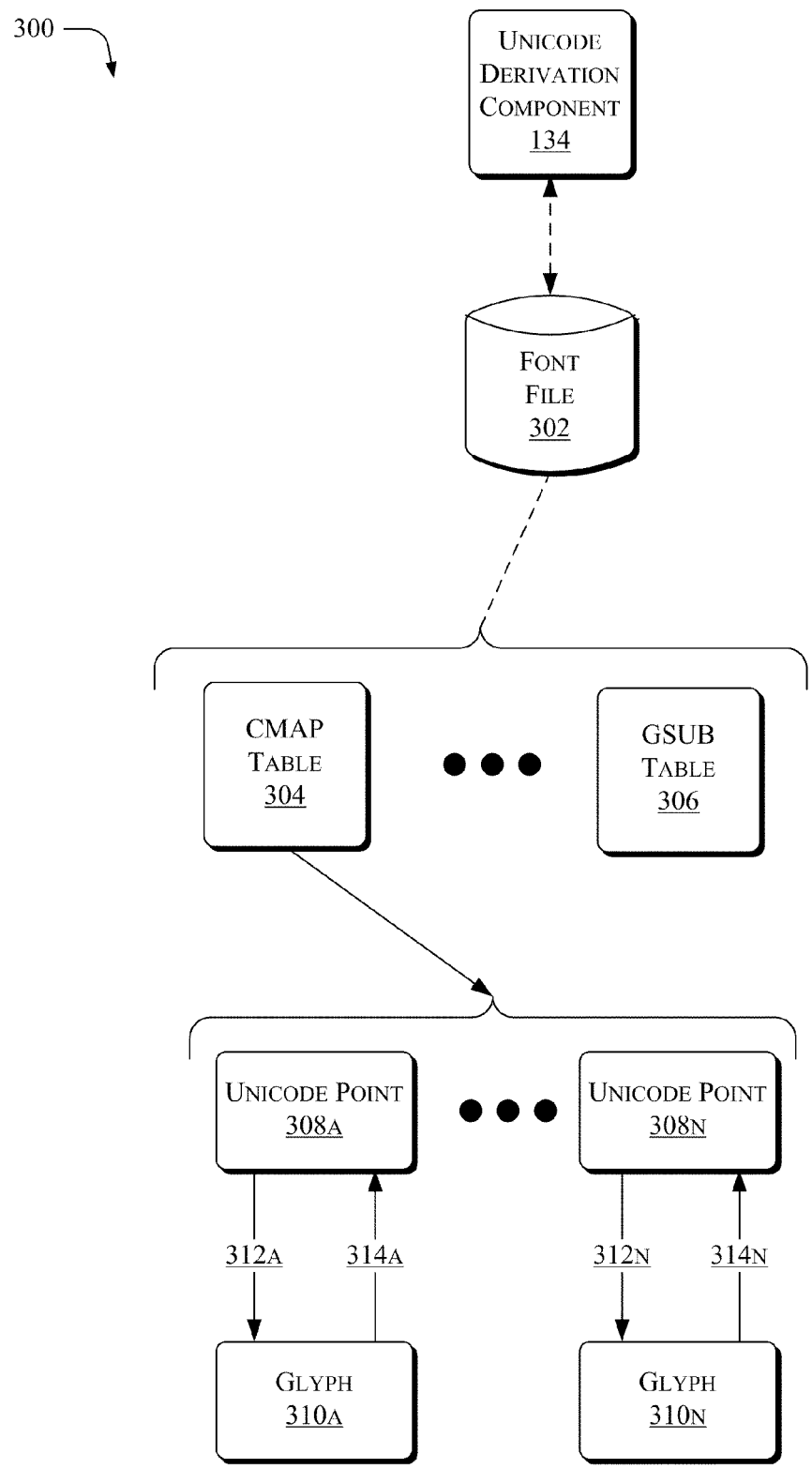
FIG. 3 is a block diagram of example data structures for a font file, depicting a character mapping (CMAP) table and a glyph substitution (GSUB) table, suitable for determining Unicode points from glyph elements.

Having described the above examples of commands that may trigger conversion of the glyphs or glyph indices to Unicode representations of text, the discussion now proceeds to a description of font files that may be used by the Unicode derivation component 134, now presented with FIG. 3.

FIG. 3 illustrates example data structures 300 for one or more font files 302. FIG. 3 depicts a character mapping (CMAP) table 304 and a glyph substitution (GSUB) table 306. For example, one or more software modules, such as the Unicode derivation component 134, may access and use the font files 302 and related CMAP table 304 and GSUB table 306 to determine or derive Unicode points from glyph elements.

Turning to the CMAP table 304 in more detail, this table maps instances of given Unicode representations of displayable characters to corresponding glyph representations of those displayable characters. Examples of the Unicode points are shown at 308A and 308N (collectively, Unicode points 308), while examples of the glyph representations are shown at 310A and 310N (collectively, Unicode points 310).

The CMAP tables 304 operate within the context of the font that is defined by the font file 302. Put differently, the Unicode points 308 identify the various characters supported by the font file 302, while the glyph representations 310 indicate the shapes or outlines of those characters as they would be rendered or displayed under the given font.

The CMAP tables 304 may map the Unicode points 308 to corresponding glyphs 310, as represented by the arrows 312A and 312N. As such, the CMAP tables may be organized for searching and access using the Unicode points as input keys. Additionally, the CMAP tables 304 may map the glyphs 310 back to corresponding Unicode points, as indicated by the arrows 314A and 314N. In these latter scenarios, the CMAP tables 304 may facilitate a form of reverse look-up, in which the Unicode derivation component 134 may locate the Unicode 308 that corresponds to a given glyph 310. In this manner, where a given glyph reverse-maps to only one Unicode, the CMAP tables 304 may enable the Unicode derivation component 134 to determine Unicode points from glyphs or glyph indices.

Figure 4:
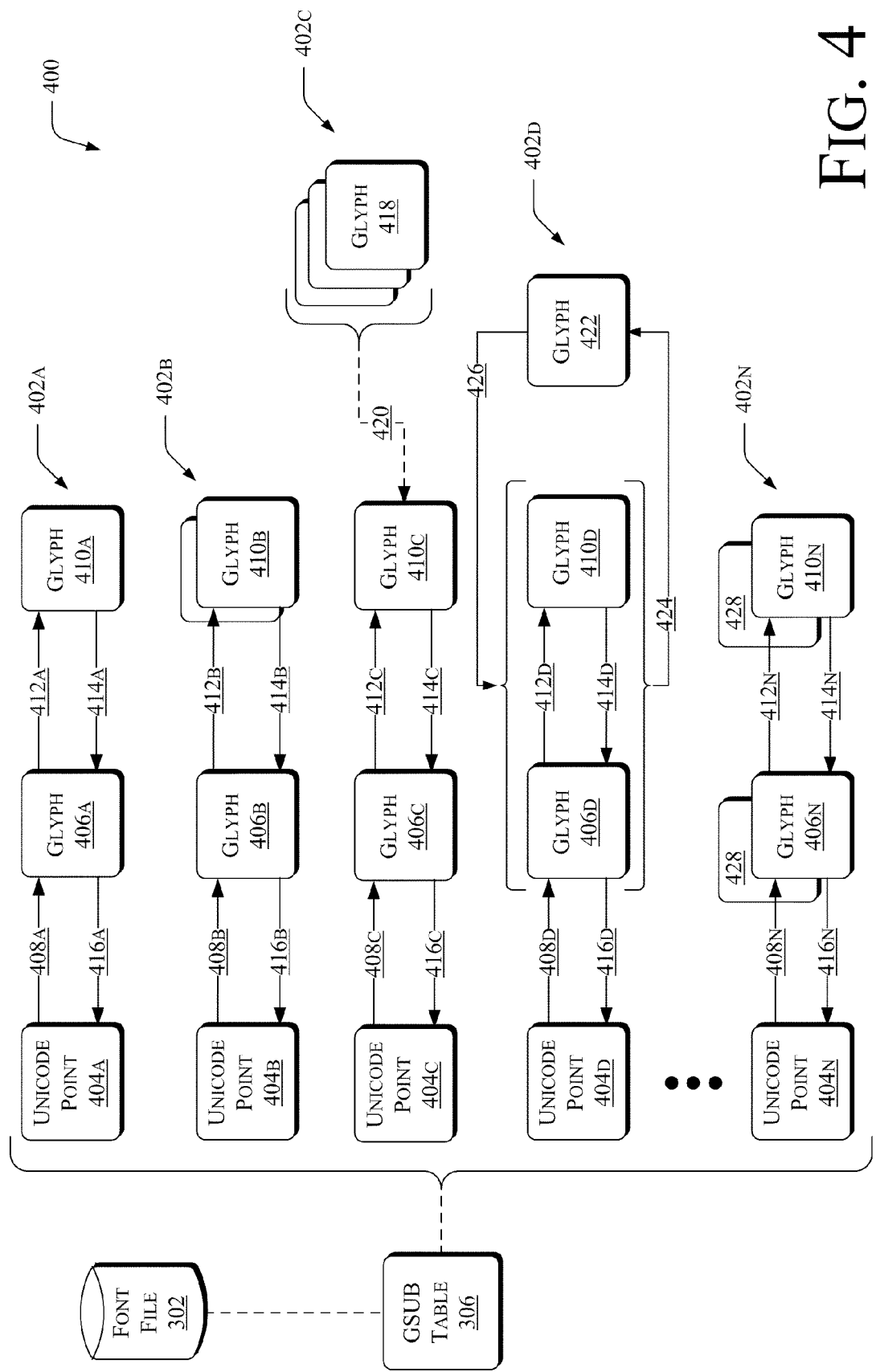
FIG. 4 is a block diagram of example data structures for the GSUB table, suitable for determining Unicode points from glyph elements.

Having described the CMAP tables that may be included in the font files 302, the discussion now proceeds to a more detailed description of the GSUB tables 306, now presented with FIG. 4. In some instances, when processing scripts in Latin languages, the CMAP tables as shown in FIG. 3 may be sufficient to derive Unicode points from glyphs.

In script languages such as Arabic, multiple Unicode points may point to a single given glyph, resulting in collisions when attempting to reverse these CMAP tables for fonts within those script languages. Put differently, when reversing a given input glyph through the CMAP tables, multiple Unicode points may point to this given glyph, so it may not be immediately apparent which of multiple different Unicode should be selected. To resolve these collisions, a component, such as the Unicode derivation component, may reverse these glyphs through one or more GSUB tables 306, as now described.

FIG. 4 provides several examples of data structures for the GSUB table 306, suitable for determining Unicode points from glyph elements. FIG. 4 illustrates several scenarios in which the GSUB table 306 maps Unicode points to glyphs, and in which the GSUB table further maps from one or more glyphs to one or more other glyphs. These different example scenarios are now described in turn.

In one example scenario, denoted at 402A, the GSUB table maps a given Unicode point 404A to a glyph 406A. FIG. 4 generally represents this mapping with the arrow 408A. The GSUB table may then substitute the glyph 406A with another glyph 410A. FIG. 4 generally represents this substitution with the arrow 412A. Thus, in one scenario, the GSUB table may receive the Unicode point 404A as input, and map this Unicode point to the glyph 406A, and then substitute this glyph 406A with the glyph 410A.

As an example of the scenario 402A, a single substitution may replace a single glyph with another single glyph. This substitution may be appropriate when rendering positional glyph variants in Arabic and vertical text in the Far East. Consider the following example:

(乗)→乗

In this example, the single substitution enables rendering of alternative forms of parentheses used when positioning Kanji vertically.

However, the scenario 402A may also operate in reverse. For example, given the glyph 410A as input, the GSUB table may be searched in reverse, such that the input glyph 410A may be reverse-substituted for the glyph 406A. This reverse-search or reverse-substitution is denoted generally by an arrow 414A. Proceeding one step further, the GSUB table may also reverse-map the glyph 406A to the original Unicode point 404A, as denoted by an arrow 416A. In this manner, the GSUB table may enable a component, such as the Unicode derivation component 134 (FIGS. 1 and 3) to determine the Unicode point 404A that corresponds to an input glyph 410A.

In another scenario, denoted at 402B, the GSUB table maps a given Unicode point 404B to a glyph 406B. FIG. 4 generally represents this mapping with the arrow 408B. The GSUB table may then substitute the glyph 406B with two or more glyphs 410B. FIG. 4 generally represents this substitution with the arrow 412B. Thus, in one scenario, the GSUB table may receive the Unicode point 404B as input, and map this Unicode point to the glyph 406B, and then substitute the glyph 406B with multiple glyphs 410B.

As an example of the scenario 402B, a multiple substitution may replace a single glyph with more than one glyph. This substitution may be appropriate when specifying actions such as ligature composition or decomposition. Consider the following example:

fi→fi

In this example, the single substitution enables decomposing a Latin ligature glyph into its individual glyph components.

The scenario 402B may also operate in reverse. For example, given the multiple glyphs 410B as input, the GSUB table may be searched in reverse, such that the input glyph 410B may be reverse-substituted for the glyph 406B. This reverse-search or reverse-substitution is denoted generally by an arrow 414B. Proceeding one step further, the GSUB table may also reverse-map the glyph 406B to the original Unicode point 404B, denoted by an arrow 416B. In this manner, the GSUB table may enable the Unicode derivation component 134 to determine the Unicode point 404B that corresponds to an instance of multiple input glyphs 410B.

In another scenario, denoted at 402C, the GSUB table maps a given Unicode point 404C to a glyph 406C. FIG. 4 generally represents this mapping with an arrow 408C. The GSUB table may then substitute the glyph 406B with a glyph 410C, denoted generally by an arrow 412C. In the example shown at 402C, the glyph 410C may be chosen from two or more possible glyphs, denoted generally at 418. FIG. 4 generally represents this selection with an arrow 420. Thus, in one scenario, the GSUB table may receive the Unicode point 404C as input, and map this Unicode point to the glyph 406C, and then substitute the glyph 406C with a glyph 410C that is chosen from a plurality of possible glyphs 418.

As an example of the scenario 402C, an alternate substitution may involve identifying functionally equivalent but different looking forms of a given glyph, and replacing the given glyphs with one of these different forms. These different forms of the glyph may be termed as aesthetic alternatives. For example, a font might have five different glyphs for the ampersand symbol, but the CMAP table may specify one default glyph index as a default. However, the client could use this default glyph index, or replace the default with any of the four alternatives. Consider the following example:

&→& & & &

In this example, this scenario enables replacing the default ampersand glyph shown on the left with any of the alternative ampersand glyphs shown on the right.

The scenario 402C may also operate in reverse. For example, given the glyph 410C as input, the GSUB table may be searched in reverse, such that the input glyph 410C may be reverse-substituted for the glyph 406C. This reverse-search or reverse-substitution is denoted generally by an arrow 414C. Proceeding one step further, the GSUB table may also reverse-map the glyph 406C to the original Unicode point 404C, denoted by an arrow 416C. In this manner, the GSUB table may enable the Unicode derivation component 134 to determine the Unicode point 404C that corresponds to an input glyph 410C, where the input glyph 410C was selected from among multiple glyphs 418.

In another scenario, denoted at 402D, the GSUB table maps a given Unicode point 404D to a glyph 406D. FIG. 4 generally represents this mapping with an arrow 408D. The GSUB table may then associate the glyph 406D with one or more glyphs 410D. FIG. 4 generally represents this association with a line 412D. Finally, the glyphs 406D and 410D, as combined or associated with one another, may be substituted with another glyph, denoted generally at 422. FIG. 4 represents this latter substitution at an arrow 424.

As an example of the scenario 402D, a ligature substitution replaces several glyph indices with a single glyph index. When a string of glyphs can be replaced with a single ligature glyph, the first glyph is substituted with the ligature. The remaining glyphs in the string may be deleted, including those glyphs that are skipped as a result of lookup flags. Consider the following example:

لمح =ل+م+ح

In this example, a string of Arabic glyphs appear on the left, and are all replaced with the Arabic ligature glyph appearing on the right.

As another example of the scenario 402D, in some Latin language fonts (e.g., Courier), the spacing between characters is uniform or standard, regardless of which particularly characters appear adjacent to one another. In contrast, other Latin language fonts (e.g., Times New Roman) may be considered as variable fonts or variable width fonts. When rendering characters in a variable font, the spacing between adjacent characters may vary, depending one which particular characters are adjacent to one another. Thus, these sequences of two characters may be combined into one glyph for rendering. These combined or coupled characters are examples of ligatures. As described further herein, these ligatures may be decoupled to discover the two glyphs that were combined to form the ligature. Afterwards, the two glyphs may then be reverse-mapped to their respective corresponding Unicode points.

As a more specific example, if the characters "f" and "i" are adjacent to one another, then these two characters may be rendered as a combined glyph "fi", where the "f" and the "i" are placed more closely to one another when rendered. In this example, the glyph 406D may represent the character "f", the glyph 410D may represent the character "i", and the line 412D may represent combining or associating these two characters so that they are rendered more closely to one another. Finally, the glyph 422 represents the combined "fi" characters as rendered in the variable font.

The scenario 402D may also operate in reverse. For example, given the glyph 422 as input, the GSUB table may be searched in reverse, such that the input glyph 422 may be reverse-substituted for the glyphs 406D and 410D. This reverse-search or reverse-substitution is denoted generally by an arrow 426. Proceeding one step further, the GSUB table may also reverse-map the glyphs 406D and 410D to the original Unicode point 404D, denoted by an arrow 416D. In this manner, the GSUB table may enable the Unicode derivation component 134 to determine the Unicode point 404D that corresponds to an input glyph 422.

In another scenario, denoted at 402N, the GSUB table maps a given Unicode point 404N to a glyph 406N. FIG. 4 generally represents this mapping with the arrow 408N. The glyph 406N appears in context with one or more other glyphs 428. The GSUB table may then substitute one or more of the glyphs 406N, in the context of one or more glyphs 428, with one or more glyphs 410N. Put differently, one or more glyphs appearing within a certain pattern of glyphs may be substituted for one or more other glyphs. These substitutions may describe one or more input glyph sequences, and one or more substitutions to be performed on that sequence. These contextual substitutions may be performed on specific glyph sequences, glyph classes, or sets of glyphs. FIG. 4 generally represents this substitution with the arrow 412N.

The scenario 402N may also operate in reverse. For example, given the glyph 410N as input, the GSUB table may be searched in reverse, such that the input glyph 410N may be reverse-substituted for the glyph 406N. This reverse-search or reverse-substitution is denoted generally by an arrow 414N. Proceeding one step further, the GSUB table may also reverse-map the glyph 406N to the original Unicode point 404N, denoted by an arrow 416M. In this manner, the GSUB table may enable the Unicode derivation component 134 to determine the Unicode point 404N that corresponds to an input glyph 410N.

Having described the CMAP tables 304 and the GSUB tables 306 in FIGS. 3 and 4, it is noted that the arrows shown therein may represent respective links, pointers, or other computer-implemented mechanisms. Assuming that the CMAP tables 304 and/or the GSUB tables 306 are implemented as computer-based data structures, these links, pointers, or other mechanisms may facilitate searching or traversal of these data structures. Examples of these arrows include elements referenced at 312 and 314 in FIG. 3, and elements referenced at 408, 412, 414, 416, 420, 424, and 426.

Additionally, again assuming that the CMAP tables and/or the GSUB tables are implemented as computer-based data structures, various elements shown in FIGS. 3 and 4 may be implemented as fields or records within those data structures. For example, blocks 308 and 310 in FIG. 3 may represent Unicode storage fields and glyph storage fields, respectively. Additionally, blocks 404 in FIG. 4 may represent various Unicode storage fields, and blocks 406, 410, 418, and 422 may represent various glyph storage fields.

Figure 5:
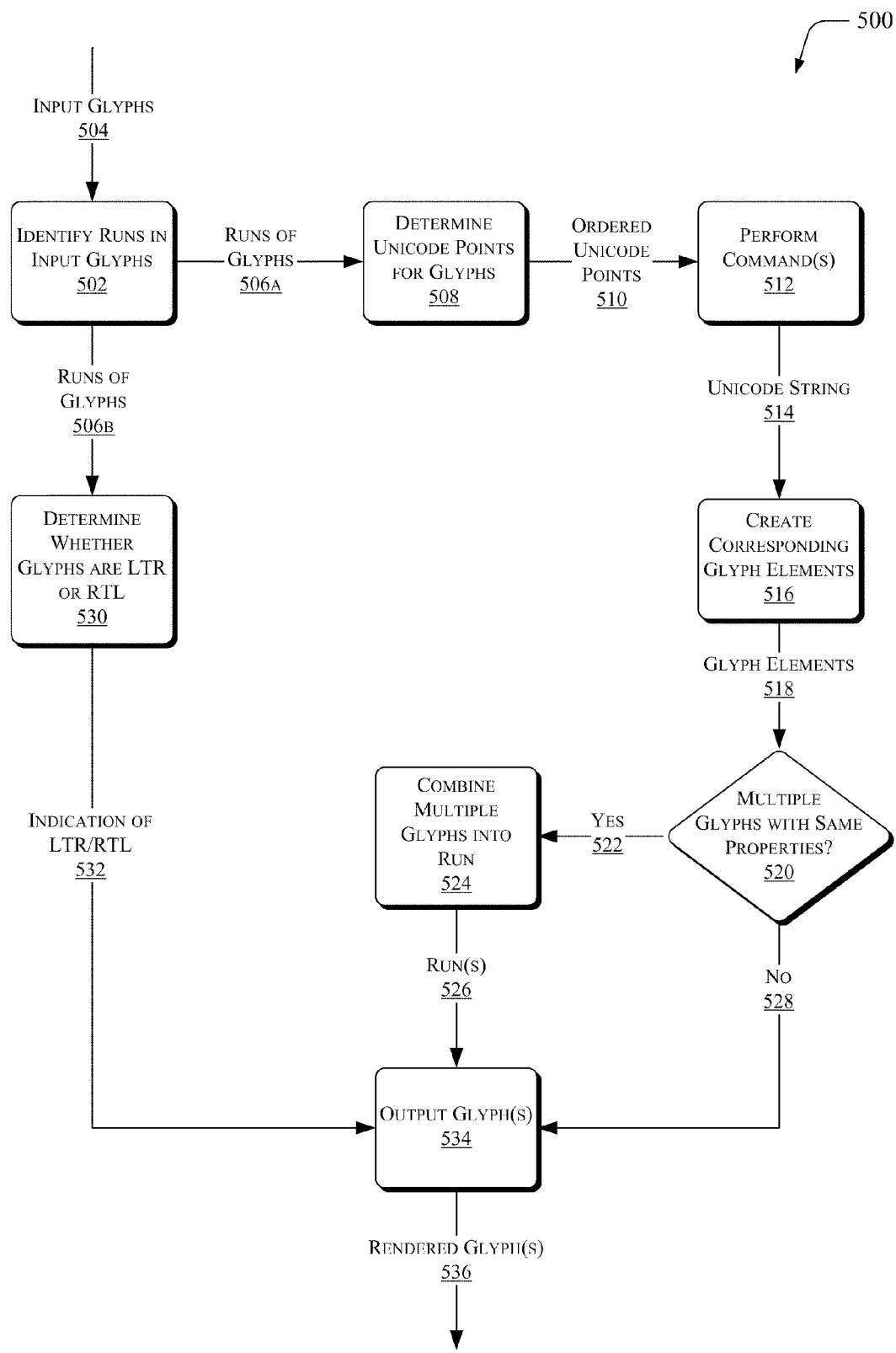
FIG. 5 is a combined process and data flow diagram of overall processes for determining Unicode points from glyph elements.

Having described various scenarios in which Unicode points may be mapped to glyphs, and in which glyphs may be substituted for other glyphs, the discussion now proceeds to a description of overall processes for determining Unicode points from glyph elements, now presented in FIG. 5.

FIG. 5 illustrates combined process and data flows 500 of overall processes for determining Unicode points from glyph elements. While the process and data flows 500 is described in connection with certain elements and components shown herein, for example, the Unicode detection component 134, it is noted that some or all of the process flow may be performed in connection with other components without departing from the spirit and scope of the description herein. The process and data flows 500 may be initiated in response to, for example, any of the user commands illustrated in FIG. 2.

Block 502 represents identifying one or more runs in a set of glyphs 504 received as input. For example, if the user selects a block of text for a cut-and-paste operation, the input glyphs 504 may represent the selected text as rendered or displayed. Examples of the input glyphs are shown at 310 in FIG. 3, and at 410 and 422 FIG. 4.

A run is a sequence of glyphs that have the same attributes when rendered. Examples of such attributes include color, typeface, styling (e.g., italics, bolding, underlining, etc.), or the like. When an attribute changes in the glyphs, this starts a new run. In any event, the runs of glyphs are denoted generally at 506.

Block 508 represents determining Unicode points for the input run of glyphs. For convenient, the run of glyphs as input to block 508 is denoted in FIG. 5 at 506A. Block 508 may include reversing the glyphs through a CMAP table and/or a GSUB table, examples of which are shown at 304 and 306 in FIGS. 3 and 4. Additionally, FIG. 6 below illustrates more detail on the processing represented generally in block 508.

Block 508 outputs one or more ordered Unicode points that correspond to the input run of glyphs 506A. For convenience, FIG. 5 denotes the output of block 508 at 510. The Unicode points 510 may be considered as ordered, in the sense that the Unicode points 510 may appear in the same order as did the incoming glyphs 506A. Examples of the Unicode points are shown at 308 in FIG. 3 and at 404 in FIG. 4.

Block 512 represents performing a command on the Unicode points 510 as output from block 508. For example, if the user has entered a command to cut-and-paste a block of text from one part of a document to another, block 512 may include altering the arrangement of Unicode points within the document to effectuate the edit sought by the user. Block 512 may also include buffering the results of any such commands for later processing. For convenience, FIG. 5 shows the output of block 512 as a string of Unicode points 514.

Block 516 represents creating glyphs for the elements within the Unicode string 514 that is output from block 512. For example, block 516 may include processing one or more CMAP tables and/or GSUB tables, examples of which are shown in FIGS. 3 and 4, to obtain the glyphs. FIG. 5 shows the output of block 516 as one or more glyphs 518.

In instances wherein the glyphs 518 include a plurality of glyphs, a decision block 520 represents determining whether two or more glyphs that have the same attributes. Examples of attributes are described above (e.g., color, typeface, style, etc.), and sequences of two or more glyphs that have the same attributes are defined as runs.

From block 520, if the input glyphs include any runs, then the process flow 500 may take Yes branch 522 to block 524. Block 524 represents combining two or more glyphs into runs 526.

Returning to block 520, if one or more glyphs in a sequence have different attributes, then the process flow 500 may take No branch 528.

Block 530 represents determining whether the input glyphs 506 are arranged to read in left-to-right (LTR) or right-to-left (RTL) order. The glyphs as input to block 530 are denoted at 506B, for convenience only. Block 530 may output a signal 532 indicating whether the input glyphs were arranged in LTR or RTL order.

Block 534 represents outputting one or more glyphs, and may receive the signal 532 indicating LTR or RTL order. Additionally, block 534 may include outputting one or more runs of glyphs that have the same attributes, if the process flow passes through block 524. These runs may form partial lines of rendered text. If the process flow passes directly from block 520 to block 534, then block 534 may include outputting the glyphs one at a time, with the glyphs having different attributes. In any event, block 534 may include rendering and outputting the glyphs in the indicated LTR or RTL order, as denoted generally at 536. Block 534 may also include employing heuristic techniques to combine one or more runs or partial lines into final output.

The rendered or output glyphs 536 would indicate the results of the command operation provided by the user. Recalling the example of the cut-and-paste operation described above, the output glyphs 536 may depict a portion of the document to which the selected text was pasted.

An example of an output glyphs element 536 follows:

<Glyphs Fill="#000000"
FontUri="font_1.TTF"
FontRenderingEmSize="12"
OriginX="277.28"
OriginY="533.6"
Indices="43,84;72,66;68,67;79,34;87,46;75,70;70,59;68,67;85,50;72,66;3,34;44,54;81,72;71,70;88,71;86,59;87,46;85,49;76,34;72,66;86"
UnicodeString="Healthcare Industries" />

The Indices property specifies a set of indices to the font file that contain the drawings of certain characters. In the previous example, the Indices correspond to characters in the UnicodeString. For example, glyph 43 corresponds to 'H', glyph 72 corresponds to 'e', and so on. The Indices may be expressed as a sequence of ordered pairs, with the glyph index for a given character being associated with an advance width of that given character. Thus, the above example specifies the Indices as a sequence of ordered pairs, with each ordered pair delimited by a semicolon, and the index and the advance width of the characters delimited by commas within the ordered pairs.

Figure 6:
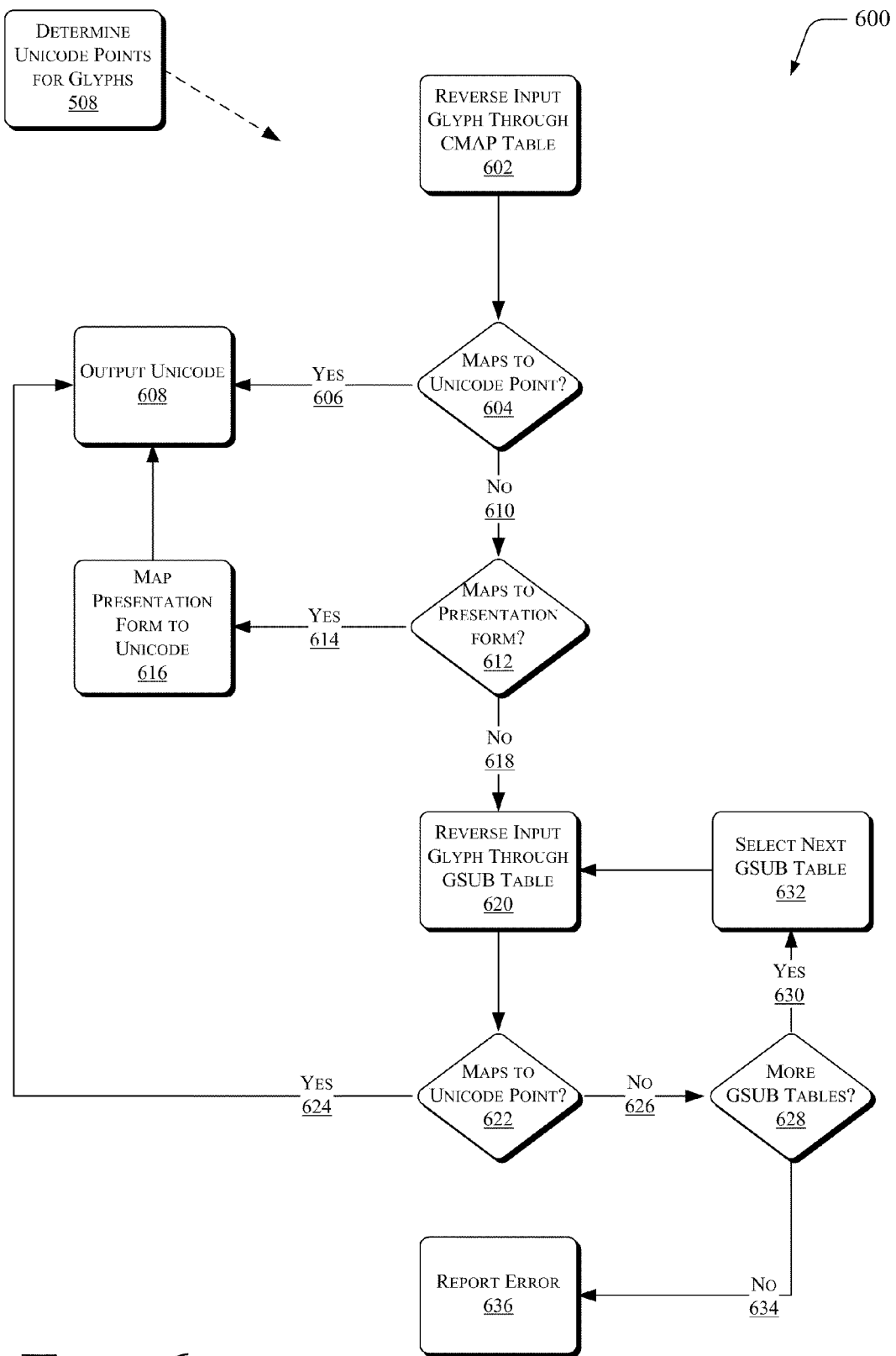
FIG. 6 is a flow diagram illustrating further details relating to determining Unicode points from glyph elements.

Having described the overall process for determining Unicode points from glyph elements in FIG. 5, the discussion proceeds to a more detailed description of a process for determining Unicode points from glyph elements, now presented in FIG. 6.

FIG. 6 illustrates a process flow 600 that provides further details related to determining Unicode points from glyph elements. The process flow 600 as shown in FIG. 6 may be viewed as expanding or elaborating on the processing represented in block 508. Thus, FIG. 6 carries forward block 508, for ease of description only, but not limitation.

Additionally, for convenience but not limitation, the process flow 600 is described in connection with the CMAP tables and GSUB tables as shown in FIGS. 3 and 4. However, it is noted that implementations of the process flow 600 may operate with other tables or other data structures without departing from the spirit and scope of the description herein.

Block 602 represents reversing the input glyphs (e.g., 506A in FIG. 5) through one or more CMAP tables (e.g., 304 in FIG. 3). Block 602 may include searching the glyphs stored in the CMAP tables (e.g., 310 in FIG. 3) for any matches to the input glyphs. If any matches are found, then block 602 may include traversing the CMAP tables to locate a Unicode with which the glyphs are associated. For example, block 602 may include traversing the arrows 314 shown in FIG. 3 to find the Unicode.

Decision block 604 determines whether the input glyphs map to a single Unicode. If so, then no collision has occurred, and the process flow 600 may take Yes branch 606 to block 608. Block 608 outputs the Unicode to which the input glyphs reverse-mapped. FIG. 5 shows an example of the output Unicode points at 510.

Returning to decision block 604, if the input glyphs do not map to a single Unicode, then the process flow 600 may take No branch 610. For example, in some instances of the CMAP tables, more than one Unicode may point to a given glyph. In other words, multiple Unicode points may "fan in" to the given glyph. Therefore, when reversing from the given glyph, the process flow 600 may be faced with multiple Unicode points. This situation may be termed as a "collision" or a "conflict". In these instances, the process flow 600 may employ additional techniques to resolve such collisions or conflicts, as now described.

In other instances, the glyph may map to a Unicode Presentation Form, which is a construct defined under the Unicode Specification. Block 612 represents evaluating whether the glyph maps to a Unicode Presentation Form. In some instances, such Presentation Forms are scaleable representations of the character itself, and may map to Unicode points. However, most applications may treat these presentation forms as final presentation forms, and typically do not support interactivity with these presentation forms. For example, in some complex scripts, applications may combine certain characters to form one or more other characters. In some instances, the application may represent these combined characters using presentation forms. A user may then enter another character near the combined characters that are represented with the presentation form. If the presentation form were not used, the application may combine the new character with the previously-combined set of characters. However, if the presentation form is used, the application typically does not attempt to combine the newly-entered character with the presentation form. In any event, if the glyph maps to a Unicode Presentation Form, then the process flow 600 may take Yes branch 614 to block 616.

Block 616 represents mapping the Unicode Presentation Form to a Unicode. Block 616 may include referring to one or more additional tables provided by the Unicode specification, and reversing these additional tables to locate the appropriate Unicode point. Afterwards, the process flow 600 may proceed to block 608.

Returning to block 612, if the glyph does not map to a Unicode Presentation Form, then there may be a collision between multiple Unicode points. In this case, the process flow 600 may take No branch 618 to block 620. It is noted that the decision blocks 612 may include testing for Unicode Presentation Forms separately from collisions between multiple Unicode points. Thus, the arrangement shown in FIG. 6 is understood to be illustrative, rather than limiting.

Block 620 represents reversing one or more of the input glyphs through, for example, one or more GSUB tables to resolve the collision and determine the Unicode(s) to which the input glyphs map. Examples of GSUB tables are shown at 306 in FIGS. 3 and 4.

After reversing the input glyphs through one or more GSUB tables, the process flow 600 may proceed to decision block 622, which determines whether the input glyphs map to a single Unicode. If the input glyphs map to a single Unicode, then the collision has been resolved, and the process flow 600 may take Yes branch 624 to block 608, which outputs the Unicode.

Returning to block 622, if reversing the input glyphs through a given GSUB table does not map to a Unicode, then the collision is not resolved. In this case, the process flow 600 may take No branch 626 to decision block 628. Block 628 evaluates whether any more GSUB tables are available for reversing. If so, the process flow 600 takes yes branch 630 to block 632, which selects another GSUB table. Afterwards, the process flow 600 returns to block 620 to reverse the input glyphs through this next GSUB table, and then proceeds once again to block 622.

Recalling FIG. 4 briefly, FIG. 4 illustrates several scenarios 402A-402N (collectively 402) that define relationships between Unicode points and glyphs. Thus, block 620 may include reversing the input glyphs through the GSUB table using one of these scenarios 402. If that scenario does not map to a Unicode, then block 632 may include selecting another one of the scenarios 402, and repeating the reverse-mapping for that new scenario.

Returning to block 628, if there are no more GSUB tables are available for reversing, then the process flow 600 may not be able to resolve the collision. In this event, the process flow 600 may take No branch 634 to block 636.

Block 636 represents reporting an error message indicating that, for example, a collision has occurred, and that the process flow 600 was unable to resolve the collision. This error message may be forwarded to a software process, or to a human user (e.g., 112).

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. A method comprising:
   under control of one or more processors executing computer-executable instructions:
   receiving an indication of at least one command relating to text that contains at least one first glyph;

determining that the at least one first glyph maps to multiple corresponding Unicode representations, the multiple corresponding Unicode representations defining a collision;

resolving the collision such that the at least one first glyph maps to only a single Unicode representation of the multiple corresponding Unicode representations;

converting the at least one first glyph to the single corresponding Unicode representation in response to the command;

performing the command on the single Unicode representation of the at least one first glyph;

creating at least one further glyph for the single Unicode representation of the at least one first glyph; and mapping the at least one further glyph element to the at least one first glyph via a glyph substitution table.

2. The method of claim 1, wherein converting the glyph includes reverse mapping the glyph through a character mapping table.

3. The method of claim 1, wherein converting the glyph includes searching a character mapping table using the glyph as input, and for obtaining the Unicode representation of the input glyph.

4. The method of claim 1, wherein converting the glyph includes reverse mapping the glyph through a glyph substitution table.

5. The method of claim 1, wherein converting the glyph includes searching a glyph substitution table using the glyph as input, and for obtaining the Unicode representation of the input glyph.

6. The method of claim 1, wherein converting the glyph includes decoupling a ligature into at a plurality of further glyphs, and for obtaining Unicode representations of the further glyphs.

7. The method of claim 1, wherein receiving an indication of at least one command includes receiving an indication of at least one command related to searching within text displayed to a user.

8. The method of claim 1, wherein receiving an indication of at least one command includes receiving an indication of at least one command related to converting text to synthesized speech.

9. The method of claim 1, wherein receiving an indication of at least one command includes receiving an indication of at least one command related to editing text displayed to a user.

10. The method of claim 1, wherein receiving an indication of at least one command includes receiving an indication of at least one command related to printing text displayed to a user.

11. A system comprising:
one or more processors; and
memory coupled to the processor, the memory comprising a Unicode deviation component that includes instructions that, when executed by the one or more processors, performs acts comprising:
receiving an indication of at least one command relating to text that contains at least one first glyph;
determining that the at least one first glyph maps to multiple corresponding Unicode representations, the multiple corresponding Unicode representations defining a collision;
resolving the collision such that the at least one first glyph maps to only a single Unicode representation of the multiple corresponding Unicode representations;
converting the at least one first glyph to the single corresponding Unicode representation in response to the command;
performing the command on the single Unicode representation of the at least one first glyph;
creating at least one further glyph for the single Unicode representation of the at least one first glyph; and
mapping the at least one further glyph element to the at least one first glyph via a glyph substitution table.

12. The system of claim 11, wherein converting the glyph includes instructions reverse mapping the glyph through a character mapping table.

13. The system of claim 11, wherein converting the glyph includes searching a character mapping table using the glyph as input, and for obtaining the Unicode representation of the input glyph.

14. The system of claim 11, wherein converting the glyph includes reverse mapping the glyph through a glyph substitution table.

15. The system of claim 11, wherein converting the glyph includes searching a glyph substitution table using the glyph as input, and for obtaining the Unicode representation of the input glyph.

16. The system of claim 11, wherein converting the glyph includes decoupling a ligature into at a plurality of further glyphs, and for obtaining Unicode representations of the further glyphs.

17. The system of claim 11, wherein receiving an indication of at least one command includes receiving an indication of at least one command related to searching within text displayed to a user.

18. The system of claim 11, wherein receiving an indication of at least one command includes receiving an indication of at least one command related to converting text to synthesized speech.

19. The system of claim 11, wherein receiving an indication of at least one command includes receiving an indication of at least one command related to editing text displayed to a user.

20. A method comprising:
under control of one or more processors executing computer-executable instructions:
determining that at least one first glyph maps to multiple corresponding Unicode representations, the multiple corresponding Unicode representations defining a collision;
resolving the collision such that the at least one first glyph maps to only a single Unicode representation of the multiple corresponding Unicode representations;
converting the at least one first glyph to the single corresponding Unicode representation in response to the command;
creating at least one further glyph for the single Unicode representation of the at least one first glyph; and
mapping the at least one further glyph element to the at least one first glyph via a glyph substitution table.

* * * * *